(12) United States Patent
Nishimoto

(10) Patent No.: US 6,312,355 B1
(45) Date of Patent: Nov. 6, 2001

(54) BICYCLE TRANSMISSION THAT SHIFTS WHEN A DRIVER IS IN A PREDETERMINED ROTATIONAL POSITION

(75) Inventor: Naohiro Nishimoto, Shimonoseki (JP)

(73) Assignee: Shimano, Inc., Osaka (JP)

( * ) Notice: Subject to any disclaimer, the term of this patent is extended or adjusted under 35 U.S.C. 154(b) by 0 days.

(21) Appl. No.: 09/187,548

(22) Filed: Nov. 5, 1998

(30) Foreign Application Priority Data

Dec. 12, 1997 (JP) .................................................. 9-343365

(51) Int. Cl.⁷ .............................. F16H 3/44; B60K 41/26
(52) U.S. Cl. ...................... 475/289; 475/298; 192/217.4
(58) Field of Search .................... 475/236, 289, 475/312, 298; 180/206, 220, 214, 221, 230; 280/237, 260; 192/217.4

(56) References Cited

U.S. PATENT DOCUMENTS

| 3,021,728 | * | 2/1962 | Shimano | 475/298 |
| 4,854,191 | | 8/1989 | Nagano | 74/750 B |
| 5,152,720 | | 10/1992 | Browning et al. | 474/80 |
| 5,303,942 | | 4/1994 | Schlumpf | 280/238 |
| 5,399,128 | * | 3/1995 | Nurnberger | 475/298 |
| 5,562,563 | * | 10/1996 | Shoge | 475/298 |
| 5,609,071 | | 3/1997 | Schlumpf | 74/594.2 |
| 5,769,750 | * | 6/1998 | Rickels | 475/298 |
| 5,829,563 | * | 11/1998 | Shoge | 475/298 |

FOREIGN PATENT DOCUMENTS

| 531608 | 3/1993 | (EP) . |
| 687622 | 12/1995 | (EP) . |
| 2208901 | 4/1989 | (GB) . |
| 2295427 | 5/1996 | (GB) . |
| 62-99293 | 5/1987 | (JP) . |
| 64-18792 | 1/1989 | (JP) . |

* cited by examiner

Primary Examiner—David A. Bucci
Assistant Examiner—Marcus Charles
(74) Attorney, Agent, or Firm—James A. Deland

(57) ABSTRACT

A bicycle shifting device includes a driver, a slave, a power transmission mechanism coupled between the driver and the slave for communicating rotational power from the driver to the slave through a plurality of power transmission paths, and a clutch for selecting one of the plurality of power transmission paths in the power transmission mechanism. A clutch actuating mechanism causes the clutch to select the one of the plurality of power transmission paths when the driver is at a predetermined rotational position.

21 Claims, 9 Drawing Sheets

BICYCLE TRANSMISSION THAT SHIFTS WHEN A DRIVER IS IN A PREDETERMINED ROTATIONAL POSITION

BACKGROUND OF THE INVENTION

The present invention is directed to bicycle transmissions and, more particularly, to an internal bicycle transmission that shifts gears when a driving member is in a predetermined rotational position.

Internal bicycle transmissions commonly have planet gear mechanisms. A planet gear mechanism comprises a gear ring, a sun gear, planet gears meshing with the gear ring and sun gear, and a carrier for supporting the planet gear. It is known that internal bicycle transmissions having such planet gear mechanisms are used to shift gears by selectively locking or unlocking any of the constituent elements of the planet gear mechanism with the aid of a clutch mechanism having lock pawls. The lock pawls are forcibly moved in the unlocking direction by a clutch-actuating mechanism that has a receiving hole for accepting the tips of the lock pawls.

When the lock pawls of the clutch mechanism are in a locked state and it is desired to change gears, a large force is needed to release the lock pawls at a time when the transmission is subjected to a driving force. Thus, the gear shifting operation is strenuous and difficult to perform unless the cyclist stops pedaling, thus increasing the complexity of the shifting operation.

Japanese Unexamined Patent Application 64-18792 describes a front shifting device designed to facilitate gear shifting so that gears can be shifted during pedaling. This front shifting device has a clutch pawl for switching the lock pawls between a locked position and an unlocked position. The clutch pawl is actuated by a clutch-actuating mechanism, and the lock pawls are forcibly actuated in the unlocking direction. However, the lock pawls are actuated indirectly via the clutch pawl rather than being actuated directly by the clutch-actuating mechanism. As a result, the mechanism for performing gear shifting is complicated., and the overall weight and cost of the transmission is increased.

SUMMARY OF THE INVENTION

The present invention is directed to an internal bicycle transmission that is easy to shift even while pedaling, wherein the transmission has a simpler structure than known transmissions. The invention can be applied to an internal transmission attached to the front crank arms, to an internal transmission forming part of a wheel hub, or to any similar transmission.

In one embodiment of the present invention, a bicycle shifting device includes a driver, a slave, a power transmission mechanism coupled between the driver and the slave for communicating rotational power from the driver to the slave through a plurality of power transmission paths, and a clutch for selecting one of the plurality of power transmission paths in the power transmission mechanism. A clutch actuating mechanism causes the clutch to select the one of the plurality of power transmission paths when the driver is at a predetermined rotational position. If desired, the predetermined position may be a position where a strong drive force is not being applied to the driver. In that case it may be desirable to have the clutch actuating mechanism cause the clutch to select each of the plurality of power transmission paths only when the driver is at the predetermined rotational position.

DETAILED DESCRIPTION OF THE EMBODIMENTS

Figure 1:
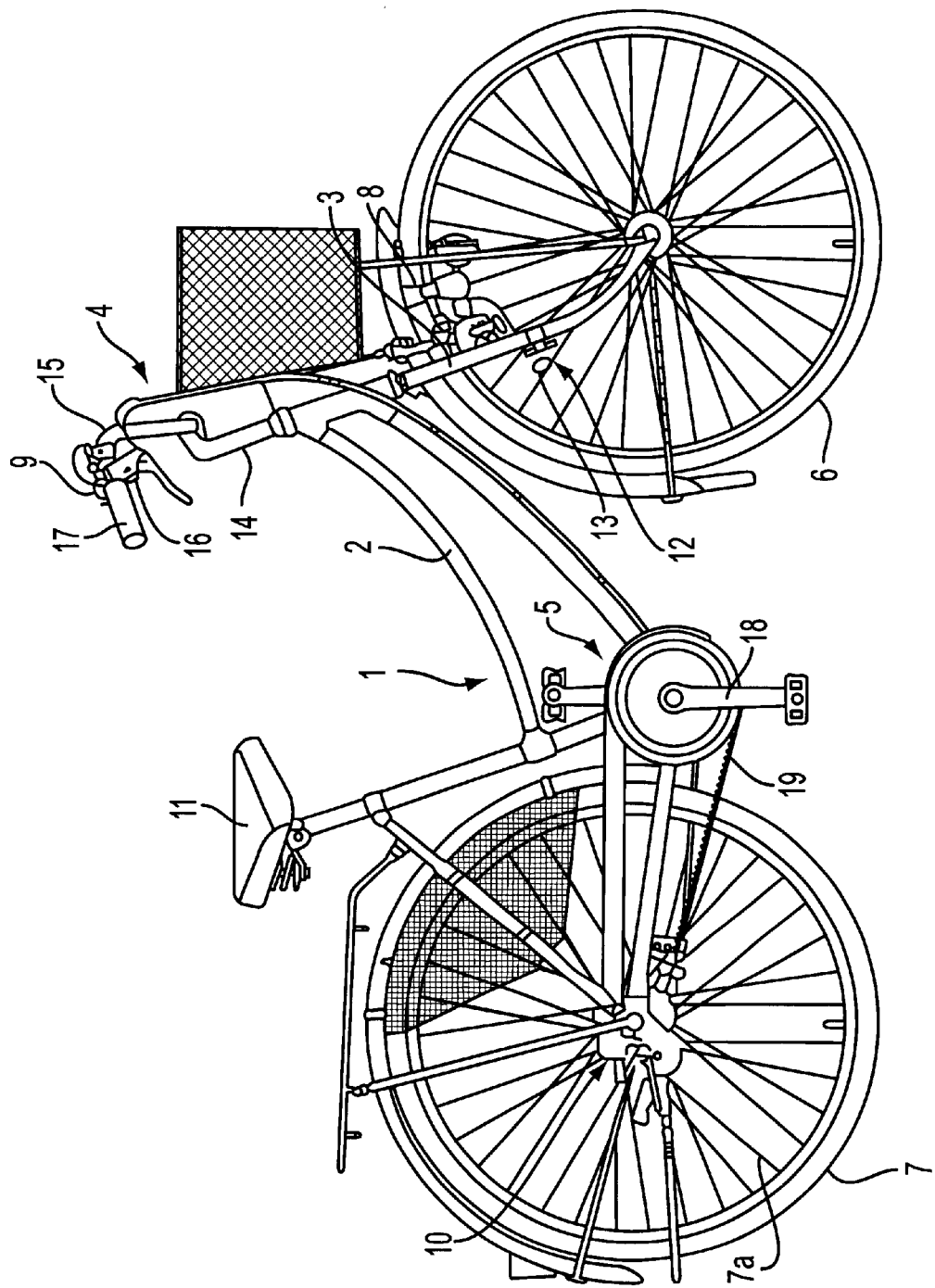
FIG. 1 is a side view of a bicycle that incorporates a particular embodiment of an internal bicycle transmission according to the present invention.

FIG. 1 is a side view of a bicycle that incorporates a particular embodiment of an internal bicycle transmission according to the present invention. The bicycle shown is a recreational bicycle comprising a frame 1 with a double loop type of frame unit 2 and a front fork 3; a handle component 4; a saddle 11; a drive component 5 equipped with a two-speed internal shifting device crank 18; a front wheel 6; a rear wheel 7; front and rear brake devices 8 (only front one shown in figure); and a shift control element 9 for conveniently operating the internal shifting device crank 18.

The handle component 4 includes a handle stem 14 that is fixed to the upper portion of the front fork 3 and a handlebar 15 that is fixed to the handle stem 14. Brake levers 16 and grips 17, which constitute part of the brake devices 8, are mounted at either end of the handlebar 15. The shift control element 9 is mounted on the right-side brake lever 16, and it is linked by a gear-shift cable (described below) to the internal shifting device crank 18.

Figure 2:
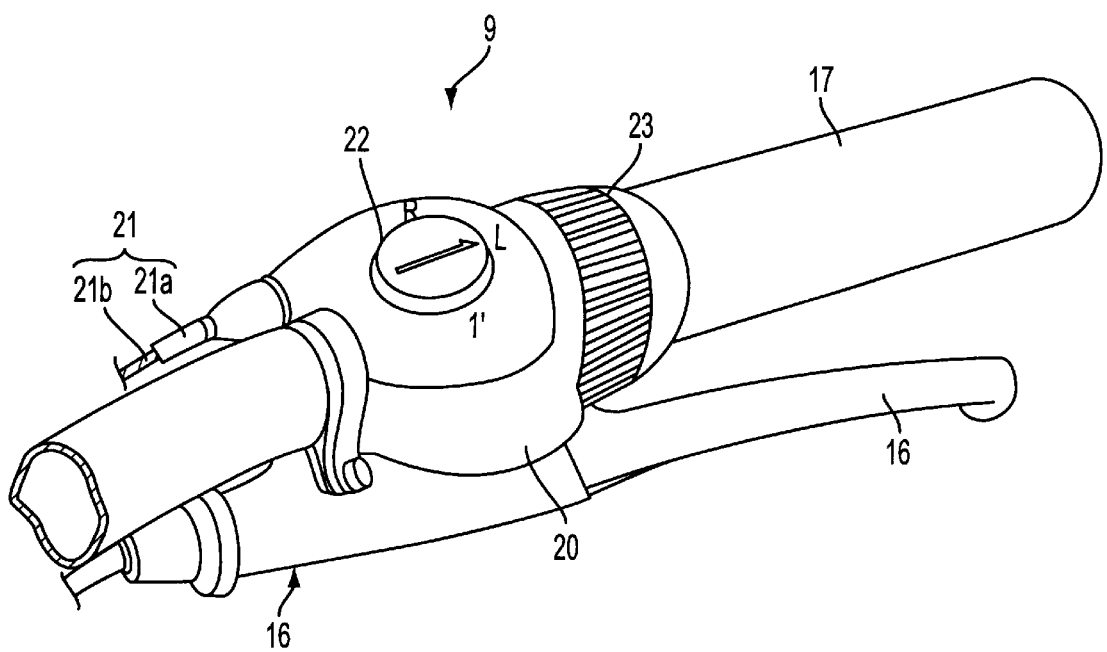
FIG. 2 is a perspective view of a particular embodiment of a shift control device used with the internal bicycle transmission according to the present invention.

As shown in FIG. 2, the shift control element 9 comprises a main unit 20, which is formed integrally with a brake bracket pivotably supporting the right-side (front wheel) brake lever 16, and a control element 23 rotatably mounted on the main unit 20. The main unit 20 comprises a dial 22 for displaying the selected speed (one of two speeds: H and L). In addition, the outer casing 21a of a gear-shift cable 21 is secured on the main unit 20. The inner wire 21b of the gear-shift cable 21 is secured in the control element 23, and it is advanced and retracted inside the outer casing 21a by the rotation of the control element 23.

Figure 3:
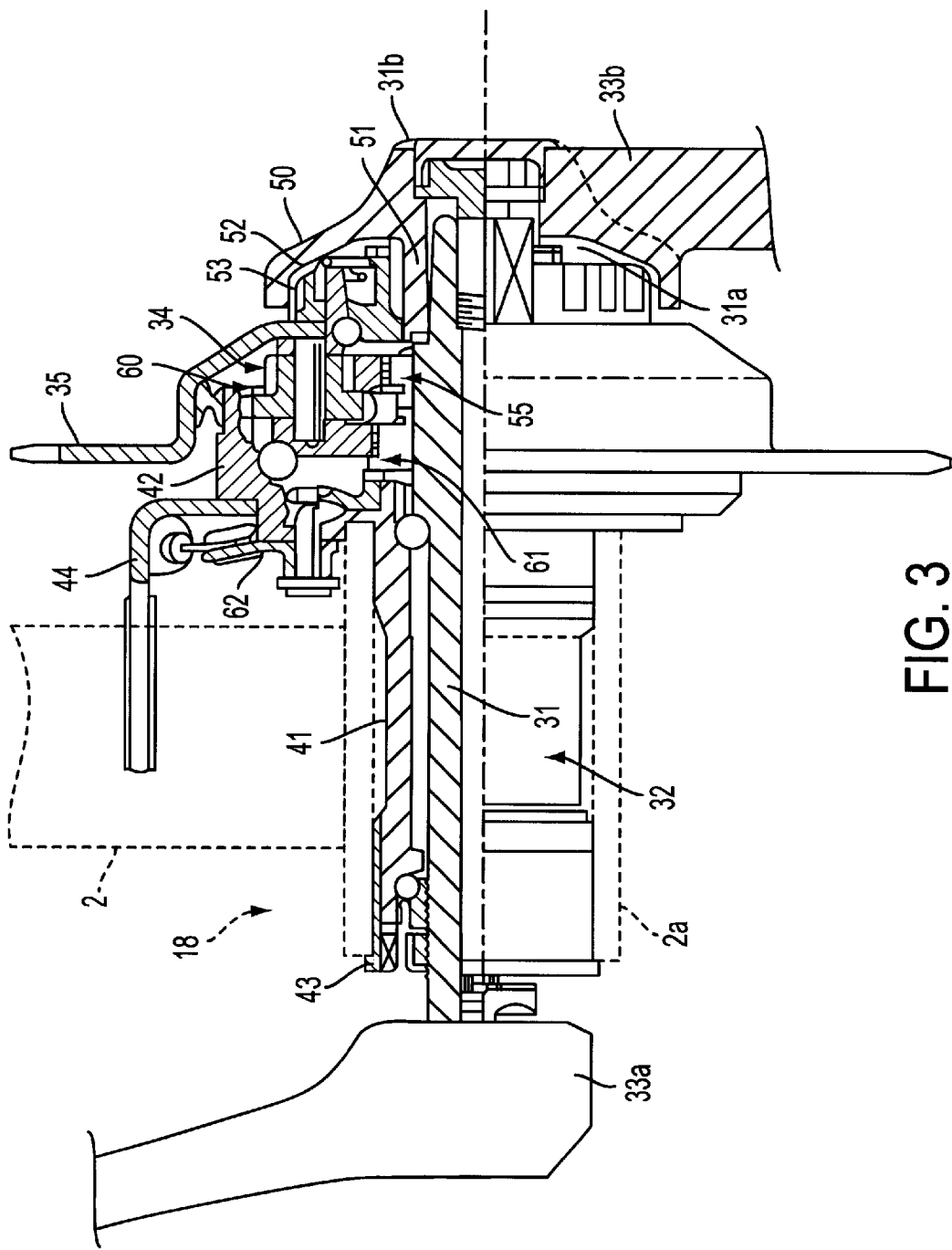
FIG. 3 is a partial cross-sectional view of the internal bicycle transmission shown in FIG. 1.
Figure 4:
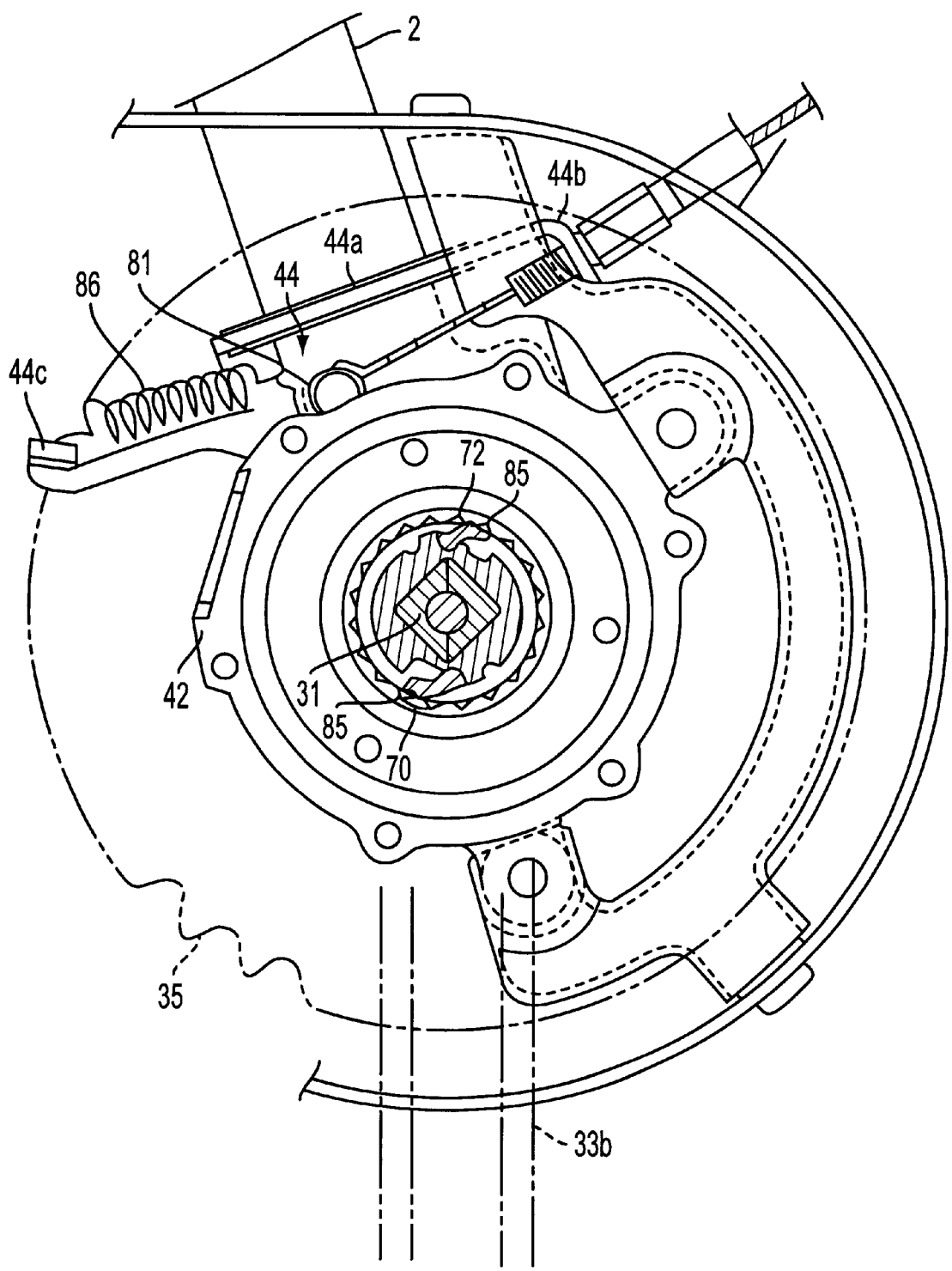
FIG. 4 is a fragmentary cross-sectional elevational view of a portion of the internal bicycle transmission that cooperates with the crank.

The drive component 5 comprises the internal shifting device crank 18, which is mounted on the cylindrical bottom bracket component 2a of the frame unit 2 (FIG. 3); a chain 19 wrapped around the internal shifting device crank 18; and a rear hub 10 on which a hub cog is mounted. As shown in FIGS. 3 and 4, the internal shifting device crank 18 comprises a bottom bracket axle (driver) 31, a bottom bracket 32 that is mounted in the bottom bracket component 2a of the frame unit 2 and that is designed to rotatably support the bottom bracket axle 31, left and right crank arms 33a and 33b nonrotatably linked to the left and right ends of the bottom bracket axle 31, a shifting device component 34 provided with two shift ratios and disposed around the outside of the bottom bracket axle 31, and a sprocket (slave) 35 linked to the bottom bracket axle 31 via the shifting device component 34. The bottom bracket axle 31 is a hollow cylindrical member having roughly rectangular (in cross section) tapered surfaces 31a at both ends, with the left and right crank arms 33a and 33b nonrotatably mounted on the tapered surfaces 31a. The crank arms 33a and 33b are fixed with lock bolts 31b.

The bottom bracket 32 comprises a main cylindrical bracket unit 41 for supporting the bottom bracket axle 31, a cylindrical bottomed casing 42 integrally formed at the right end (FIG. 3) of the main bracket unit 41, and a cylindrical nut 43 mounted at the left end of the main bracket unit 41. The bottom bracket 32 is mounted in the bottom bracket component 2a by tightening the main bracket unit 41, which is inserted through the right end of the bottom bracket component 2a, with the cylindrical nut 43.

Figure 5:
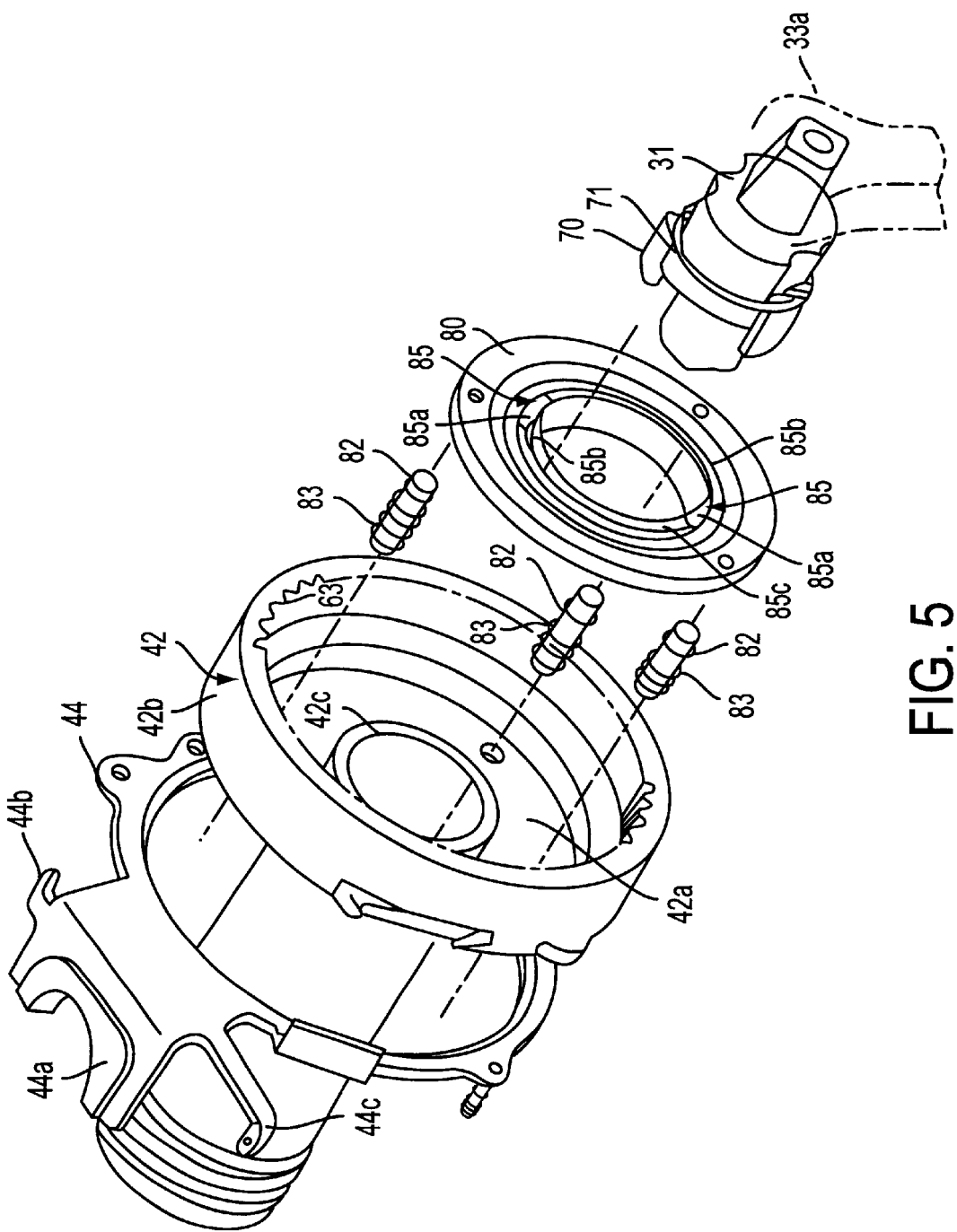
FIG. 5 is an exploded view of a particular embodiment of a clutch actuating mechanism according to the present invention.
Figure 6:
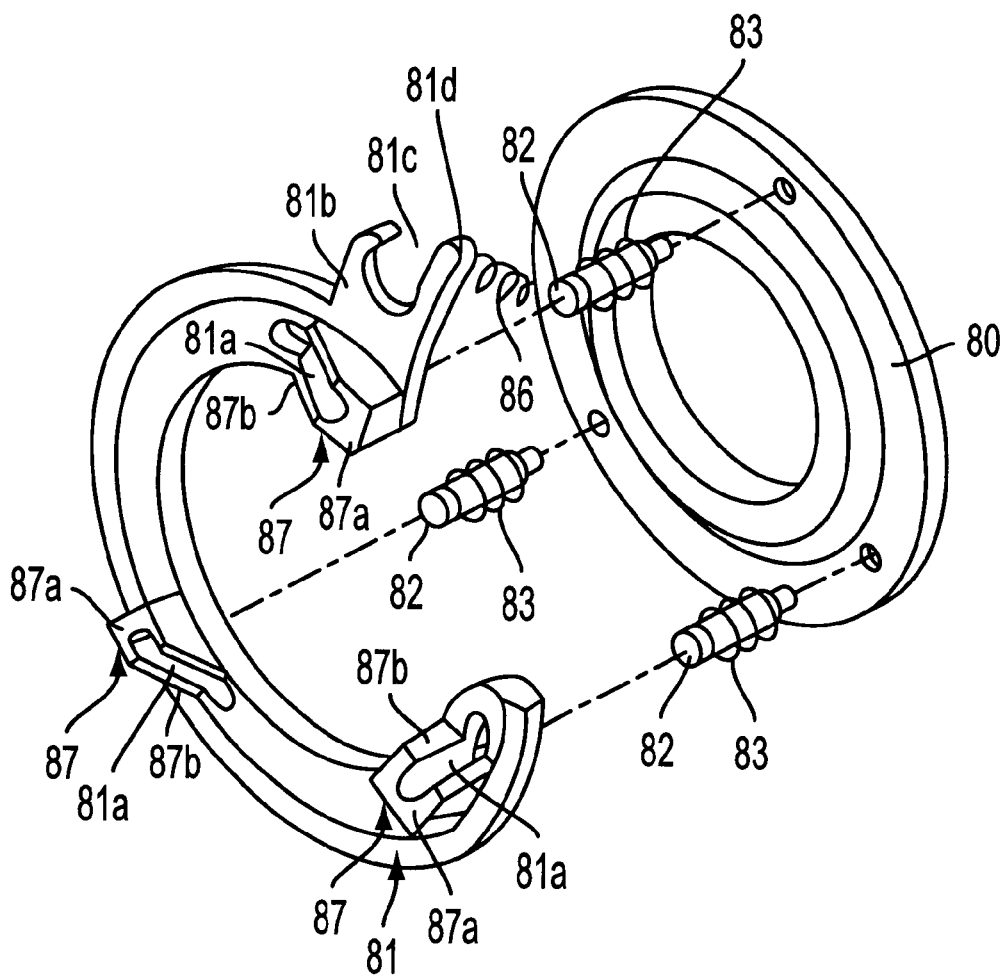
FIG. 6 is a detailed view of a particular embodiment of a cam plate and rotary plate used in the clutch actuating mechanism according to the present invention.
Figure 7:
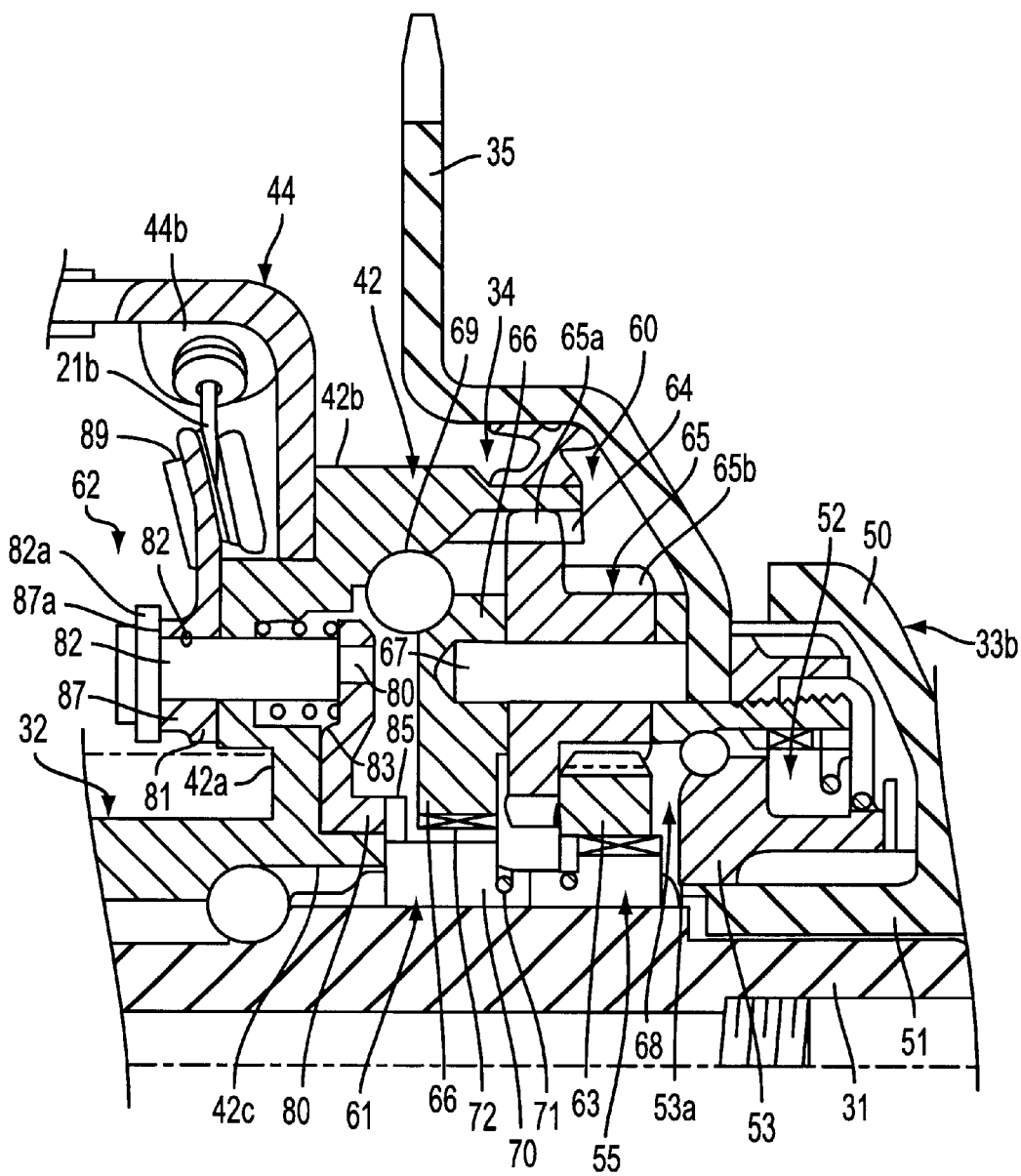
FIG. 7 is a detailed view of the internal bicycle transmission showing the clutch engaged.

As shown in FIG. 7, the casing 42 comprises a wall component 42a, a cylindrical component 42b integrally formed with the wall component 42a around the outside of the wall component 42a, and a projection 42c around the inside of the wall component 42a. An annular discoid guide plate 44 is secured with bolts to the wall component 42a of the casing 42 as shown in FIG. 5 so that the casing 42 is nonrotatably secured with the guide plate 44 on the frame unit 2. A stopper 44a secured to the frame unit 2, a cable catch 44b projecting forward from the stopper 44a, and spring-securing element 44c (FIG. 4) are formed along the circumference of the guide plate 44. One end of the outer casing 21a of the gear-shift cable 21 (the other end of which is secured to the main unit 20 of the shift control element 9) is secured with the cable catch 44b. One end of a coil spring 86 for the rearward urging of a below-mentioned rotary plate 81 (FIG. 6) is secured on the spring-securing element 44c.

Of the crank arms 33a and 33b, the crank arm 33a on the left side has the same structure as a conventional crank arm. The crank arm 33b on the right side has a pan-shaped housing element 50 near its base end, and a boss 51 is formed in the center of the housing element 50. Part of the shifting device component 34 and a reversing one-way clutch 52 are mounted inside the housing element 50. The one-way clutch 52 transmits solely the backward rotation of the crank arms 33a and 33b to the sprocket 35 via the shifting device component 34. A right-side hub cone 53 is mounted around the outside of the boss 51 while allowed to turn by a prescribed angle in the direction of rotation, and the one-way clutch 52 is linked to the shifting device component 34 via the right-side hub cone 53. A cage 53a for disengaging the below-described one-way clutch 55 during reverse rotation is fixed to the surface on the left side of the right-side hub cone 53.

The shifting device component 34 comprises a planet gear mechanism 60 having two power transmission paths (a direct-coupled transmission path and a downshifted transmission path), a clutch mechanism 61 for selecting one of the two power transmission paths, and a clutch-actuating mechanism 62 designed to force the clutch mechanism 61 to perform selection procedures, thus allowing at least one of these selection procedures to be performed in alignment with the top dead center and bottom dead center of the crank arms 33a and 33b.

As shown in FIG. 7, the planet gear mechanism 60 comprises a sun gear 63 disposed inside the casing 42 and linked to the bottom bracket axle 31 via the one-way clutch 55, a gear ring 64 formed around the inside of the cylindrical component 42b of the casing 42, three planet gears 65 (only one is shown) meshing with the sun gear 63 and gear ring 64, and a carrier 66 for rotatably supporting the three planet gears 65. The sun gear 63 is disposed coaxially with the bottom bracket axle 31 around the outside thereof, and it is linked to the bottom bracket axle 31 via the one-way clutch 55. The one-way clutch 55 transmits solely the forward rotation (clockwise rotation in FIG. 4) of the bottom bracket axle 31 to the sun gear 63. The three planet gears 65 are spaced at regular intervals in the circumferential direction and are provided with a large gear 65a and a hub cog 65b, which are aligned in the axial direction. The large gear 65a meshes with the gear ring 64, and the hub cog 65b meshes with the sun gear 63. The planet gears 65 are rotatably supported by a cog axle 67 on the carrier 66.

The carrier 66 is a roughly cylindrical member having in its outer circumferential portion three spaces for accommodating the three planet gears 65. The outer circumferential surface of the left end of the carrier 66 is rotatably supported in the casing 42 by a bearing component 69. The carrier 66 can thus rotate around the bottom bracket axle 31. The sprocket 35 is nonrotatably mounted on the right end of the carrier 66. The one-way clutch 52 is mounted on the inner circumferential surface at the right end of the carrier 66, and the clutch mechanism 61 is mounted on the inner circumferential surface at the left end of the carrier 66.

The clutch mechanism 61 transmits solely the forward rotation of the bottom bracket axle 31 in the "clutch-on" or engaged state to the carrier 66, and separates the carrier 66 and the bottom bracket axle 31 in the "clutch-off" or disengaged state. The clutch mechanism 61 comprises two lock pawls 70 mounted on the bottom bracket axle 31 while allowed to pivot between a linked state and a disengaged state, a spring member 71 for urging the two lock pawls 70 toward a linked state, and a lock tooth 72 formed on the inner circumferential surface of the carrier 66. The lock pawls 70 are disposed facing the inner circumferential portion at the left end of the carrier 66 and are spaced at regular intervals in the circumferential direction. The lock tooth 72 formed in the shape of a wave on the inner circumferential that faces the lock pawls 70 of the carrier 66. As a result, the carrier 66 rotates backward via the one-way clutch 52 when the crank arms 33a and 33b rotate backward (counterclockwise direction in FIG. 4), and the carrier 66 rotates forward together with the bottom bracket axle 31 when the bottom bracket axle 31 rotates forward (clockwise direction in FIG. 4), with the clutch mechanism 61 in the "on" state.

The clutch-actuating mechanism 62 is a mechanism for forcibly moving the lock pawls 70 of the clutch mechanism 61 from a linked state to a separated state. As shown in FIGS. 5–7, the clutch-actuating mechanism 62 comprises a cam plate 80 disposed such that it faces the left side of the carrier 66 across a gap, a facing rotary plate 81 disposed such that the wall component 42a of the casing 42 is sandwiched between the cam plate 80 and the rotary plate 81, three link pins 82 for linking the cam plate 80 and the rotary plate 81, and three coil springs 83 for urging the cam plate 80 toward the carrier 66.

The cam plate 80 is supported on the wall component 42a of the casing 42 by the three link pins 82 while allowed to move axially to the left and right. In addition, the inner circumferential portion of cam plate 80 is movably supported by the projection 42c of the casing 42. Cams 85 protruding toward the carrier 66 are formed at two locations separated by 180 degrees. The cams 85 comprise a flat surface 85a extending to the right in FIG. 5 and a sloping guide surface 85b formed such that the outer circumference of the flat surface 85a is extended beyond its inner circumference in the direction of a reference surface 85c below the flat surface 85a. The cams 85 are designed to move the lock pawls 70 of the clutch mechanism 61 from the linked state to the separated state by using the rotation of the bottom bracket axle 31 during lock release. More specifically, the guide surfaces 85b of the cams 85 are designed to guide the lock pawls 70 along the inner circumferential surface of the cam plate 80 when the lock pawls 70 have been lowered from the linked state to the separated state by the rotation of the bottom bracket axle 31. These guide surfaces 85b are formed at positions in which the two lock pawls 70 are simultaneously lowered into a separated state when the crank arms 33a and 33b are in the vicinity of the top dead center and bottom dead center.

As shown in FIG. 6, the rotary plate 81 is shaped as a notched ring, with three through holes 81a for accepting the three link pins 82 spaced at regular intervals in the circumferential direction. The rotary plate 81 is rotatably supported in the casing 42 through the intermediary of the three link pins 82 passing via the through holes 81a. Cam components 87 are formed, on the left side in FIG. 6 in the areas where the through holes 81a are provided. The cam components 87 comprise a flat surface 87a protruding to the left and a slanted surface 87b sloping from the flat surface 87a in the circumferential direction toward a reference surface 87c below the flat surface 87a. A stopper plate 82a to which functions as a cam follower for the cam components 87 is mounted on the link pins 82 and is caused to move to the left and right by the rotation of the rotary plate 81. The coil springs 83 are disposed in compressed state around the outsides of the link pins 82, thus urging the cam plate 80 to the right in FIG. 6.

A radially extending projection 81b, which is provided to one end of the rotary plate 81, comprises a concavity 81c and a spring stopper 81d. A stopper nut 89 secured to the inner cable 21b of the gear-shift cable 21 is mounted in the concavity 81c. In addition, one end of the coil spring 86 (the other end of which is secured to the spring-securing element 44c of the guide plate 44) is secured to the spring stopper 81d. The rotary plate 81 is thus constantly urged clockwise in FIG. 6.

The shifting device component 34 transmits motive power along one of the following two power transmission paths: 1) a direct-coupled transmission path for transmitting motive power from the bottom bracket axle 31 directly to the sprocket 35 via the clutch mechanism 61 and carrier 66; and 2) a downshifted transmission path for transmitting motive power to the sprocket 35 via the sun gear 63, planet gears 65, and carrier 66.

The rotary plate 81 is pulled by the inner cable 21 a when the transmission is in the direct-coupled state. When this happens, the link pins 82 are on the left and the cam plate 80 retracts to the standby position on the left side when the stopper plate 82a rests on the flat surfaces 87a of the cam components 87, as shown in FIG. 7. In this state, the lock pawls 70 of the bottom bracket axle 31 remain in a linked state, unimpeded by the cam plate 80. As a result, the rotation of the bottom bracket axle 31 is transmitted directly to the carrier 66 via the lock pawls 70 of the clutch mechanism 61, and then on to the sprocket 35 from the carrier 66. The sprocket 35 therefore rotates at the same high speed as the bottom bracket axle 31.

Figure 8:
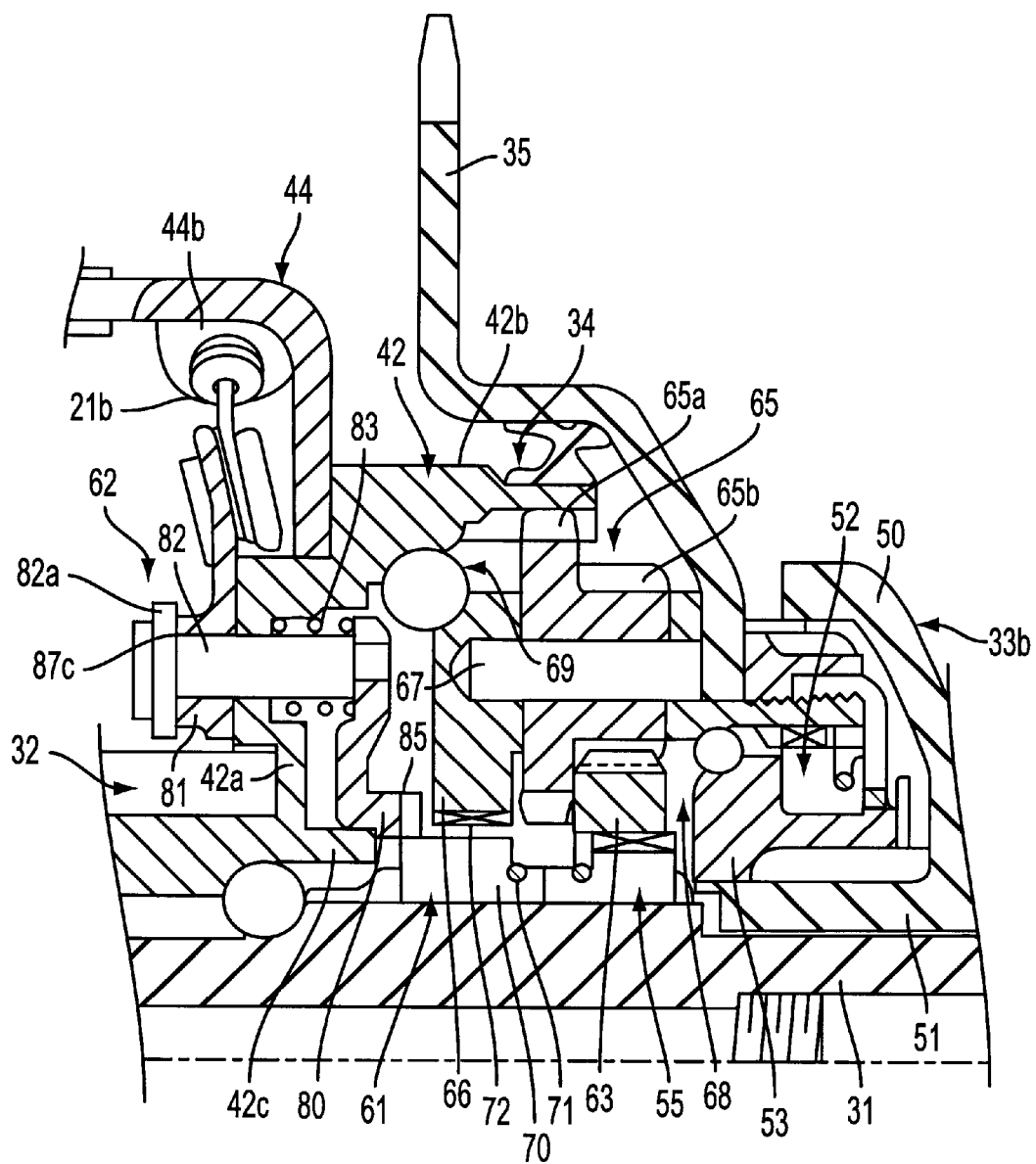
FIG. 8 is a detailed view of the internal bicycle transmission showing the clutch disengaged.

When, however, the shift control element 9 is moved to a lower speed, the inner cable 21b of the gear-shift cable 21 becomes loose, and the rotary plate 81 is pulled by the coil spring 86 and caused to rotate in the clockwise direction in FIG. 6. When this happens, the cam plate 80 is urged by the coil springs 83 and pushed to the right toward the operating position as shown in FIG. 8 because the stopper plate 82a is disposed below the flat surface 87a.

Rotating the bottom bracket axle 31 in this state causes the tips of the lock pawls 70 to be guided along the inner circumference when the lock pawls 70 reach the guide surfaces 85b of the cams 85 as a result of this rotation. When the guided lock pawls 70 have reached the inner circumferential surface of the cam plate 80, the cam plate 80 urged by the coil springs 83 is pushed farther to the right, and the lock pawls 70 enter the inner circumferential surface of the cam plate 80, collapsing from the linked state to the separated state, as shown in FIG. 8. The rotation of the bottom bracket axle 31 is transmitted from the one-way clutch 55 to the carrier 66 via the sun gear 63 when the lock pawls 70 have been lowered into the separated state. The sprocket 35 therefore rotates at a lower speed.

The timing for bringing down the lock pawls 70 is determined by the position in which the cams 85 are located, and in this embodiment it is synchronized with the positioning of the crank arms 33a and 33b in the vicinity of the top dead center or bottom dead center. The lock pawls 70 can therefore be smoothly lowered because virtually no motive power is transmitted by these pawls at this time.

The shift ratio $R=(T1\times T3)/((T1\times T3)+(T2\times T4))$, where T1 is the number of teeth of the large gear 65a, T2 is the number of teeth of the hub cog 65b, T3 is the number of teeth of the sun gear 63, and T4 is the number of teeth of the gear ring 64. Assuming that T1=24, T2=15, T3=51, and T4=90, and substituting these numerical values into the above equation, we obtain 0.4755 for the shift ratio R. In other words, the sprocket 35 performs 0.4755 of a rotation every time the bottom bracket axle 31 makes one fill turn.

Here, the rotational speed of the sprocket 35 during downshifting is about ½ that maintained during direct coupling. Thus, in comparison with a case in which the planetary gears consists of a single toothed component, greater downshifting can be achieved by configuring the planet gears 65 from large gear 65a and a hub cog 65b, and arranging the components such that the large gear 65a meshes with the gear ring 64, and the hub cog 65b meshes with the sun gear 63.

Rotating the crank arms 33a and 33b backward causes the bottom bracket axle 31 and the right-side hub cone 53 to rotate a prescribed angle relative to each other, and the cage 53a disengages the pawls of the one-way clutch 55. This is done in order to prevent a situation in which the sun gear 63 rotated by the carrier 66 via the planet gears 65 during reverse rotation is rotated at a higher speed than the bottom bracket axle 31 and becomes locked by the two one-way clutches 52 and 55. As a result, no motive power is transmitted to the planet gear mechanism 60 via the clutch mechanism 61 or the one-way clutch 55 in any gear-shifting position. In this embodiment, motive power is transmitted to the carrier 66 via the one-way clutch 52, and the sprocket 35 is rotated in reverse. As a result, braking can be performed by rotating the rear hub 10 backward, even when a coaster brake is mounted on the rear hub 10. It is, however, unnecessary to mount the one-way clutch 52 or cage 53a on a rear hub which does not have a coaster brake.

As a result of the present invention, gears can be shifted in any state because the clutch mechanism 61 can be directly selected and actuated by the clutch-actuating mechanism 62 and because the gears can be selected and shifted from a higher speed step to a lower speed step when the arrangement is aligned with the top dead center or bottom dead center of the crank arms 33a and 33b. The gears can therefore be shifted with little exertion without any increase in weight or cost.

While the above is a description of various embodiments of the present invention, further modifications may be employed without departing from the spirit and scope of the present invention. For example, the size, shape, location or orientation of the various components may be changed as desired. The functions of one element may be performed by two, and vice versa.

Figure 9:
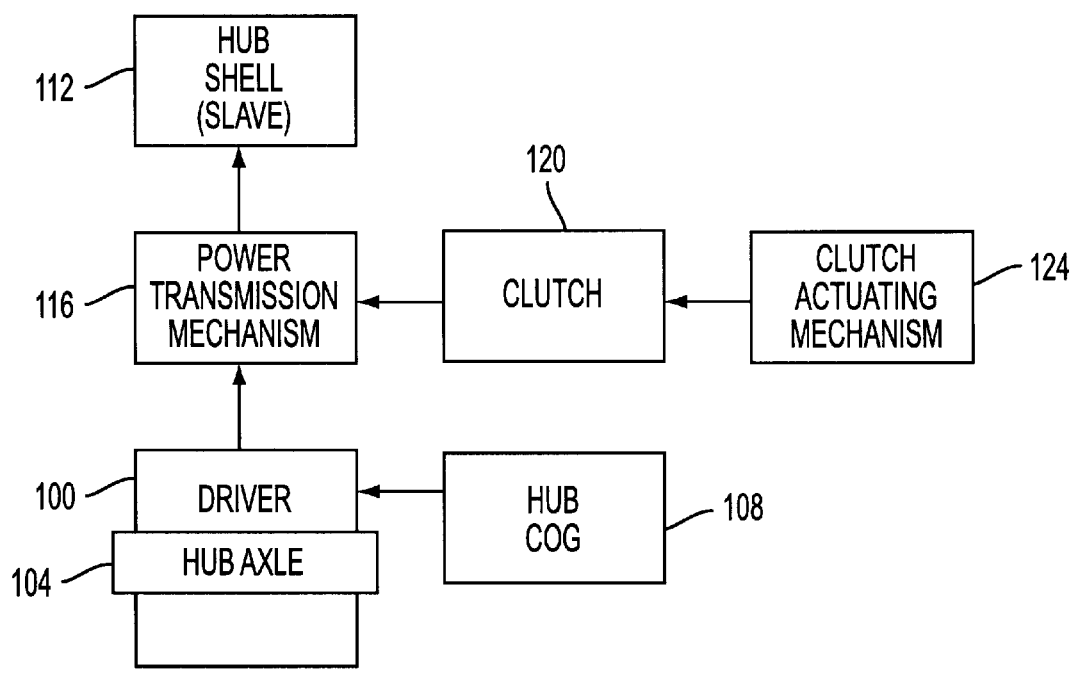
FIG. 9 is a schematic block diagram of an alternative embodiment the present invention.

Although the described embodiment was directed to a front shifting device, the present invention can also be applied to a rear shifting device in which a driver 100 is rotatably supported on a hub axle 104 of a bicycle in order to mount a hub cog 108 linked to the sprocket 35 with a chain 19, and in which a slave 112 in the form of a rear wheel hub shell component is mounted inside the rear hub 10 as shown schematically in FIG. 9. In this case a power transmission mechanism 116 is coupled between the driver 100 and the slave 112 for communicating rotational power from the driver 100 to the slave 112 through a plurality of power transmission paths, a clutch 120 is provided for selecting one of the plurality of power transmission paths in the power transmission mechanism 116 when the driver 100 is in one of a first plurality of rotational positions, and a clutch actuating mechanism 124 is provided for causing the clutch 120 to select the one of the plurality of power transmission paths when the driver 100 is in one of a second plurality of rotational positions less than the first plurality of rotational positions.

Although the described embodiment showed the clutch mechanism being actuated by a cam, the structure of the clutch-actuating mechanism is not limited to this cam alone. Although the described embodiment pertained to a case in which the present invention was applied to a two-speed shifting device, the number of speed steps is not limited to two and can be any number greater than two. Furthermore, although the described embodiment showed two power transmission paths through a planet gear mechanism, the direct-coupled transmission path does not necessarily involve a planet gear mechanism and may comprise a directly coupled driver and slave.

Thus, the scope of the invention should not be limited by the specific structures disclosed. Instead, the true scope of the invention should be determined by the following claims.

What is claimed is:

1. A bicycle shifting device comprising:
    a driver;
    a slave;
    a power transmission mechanism coupled between the driver and the slave for communicating rotational power from the driver to the slave through a plurality of power transmission paths;
    a clutch for selecting an individual transmission path from the plurality of power transmission paths in the power transmission mechanism by moving from a first clutch position to a second clutch position; and
    a clutch actuating mechanism for causing the clutch to move from the first clutch position to the second clutch position when the clutch is in the first clutch position only when the driver is at a predetermined subset of rotational positions less than all of the possible rotational positions of the driver and for preventing the clutch from moving from the first clutch position to the second clutch position when the clutch is in the first clutch position and the driver is at rotational positions other than the predetermined subset of rotational positions.

2. The device according to claim 1 wherein the clutch actuating mechanism causes the clutch to select each of the individual transmission paths from the plurality of power transmission paths when the driver is at the predetermined subset of rotational positions.

3. The device according to claim 1 wherein the driver comprises an axle.

4. The device according to claim 1 wherein the driver is rotatably mounted to a wheel hub axle.

5. The device according to claim 1 wherein the power transmission mechanism comprises:
    a sun gear rotatably mounted relative to the driver;
    a planet gear carrier rotatably mounted relative to the driver;
    a planet gear rotatably mounted on the carrier and engaging the sun gear; and
    a gear ring meshing with the planet gear.

6. The device according to claim 1 wherein the power transmission mechanism communicates only forward rotational power from the driver to the slave through the plurality of power transmission paths.

7. The device according to claim 2 wherein the predetermined subset of rotational positions is the same for each selected individual transmission path.

8. The device according to claim 3 wherein the driver comprises a bottom bracket axle.

9. The device according to claim 4 wherein the slave comprises a hub shell for mounting a wheel.

10. The device according to claim 5 wherein the clutch comprises a first one-way clutch disposed in a transmission path in the power transmission mechanism between the driver and the slave and switchable between an engaged state and a disengaged state.

11. The device according to claim 6 wherein the clutch actuating mechanism causes the clutch to select the individual transmission path from the plurality of power transmission paths only when the driver is rotating forward and is disposed at a predetermined forward rotational position and prevents the clutch from selecting the individual transmission path from the plurality of power transmission paths when the driver is at other forward rotational positions.

12. The device according to claim 7 wherein the clutch actuating mechanism causes the clutch to select each of the individual transmission paths only when the driver is at the predetermined subset of rotational positions.

13. The device according to claim 8 wherein the slave comprises a sprocket for engaging a chain.

14. The device according to claim 10 wherein the clutch actuating mechanism switches the first one-way clutch into the disengaged state when the driver is at the predetermined rotational position.

15. The device according to claim 10 wherein the first one-way clutch is disposed between the driver and the planet gear carrier.

16. The device according to claim 15 wherein the first one-way clutch comprises:
    a pawl mounted to the driver and movable between an engaged position for linking rotation of the driver with the planet gear carrier and a disengaged position;
    a spring biasing the pawl toward the engaged position; and
    wherein the clutch actuating mechanism switches the pawl into the disengaged position when the driver is at the predetermined rotational position.

17. A bicycle shifting device comprising:

a driver;

a slave;

a power transmission mechanism coupled between the driver and the slave for communicating rotational power from the driver to the slave through a plurality of power transmission paths;

wherein the power transmission mechanism includes:
- a sun gear rotatably mounted relative to the driver;
- a planet gear carrier rotatably mounted relative to the driver;
- a planet gear rotatably mounted on the carrier and engaging the sun gear; and
- a gear ring meshing with the planet gear;

a clutch for selecting an individual transmission path from the plurality of power transmission paths in the power transmission mechanism;

a clutch actuating mechanism for causing the clutch to select the individual transmission path from the plurality of power transmission paths when the driver is at a predetermined rotational position;

wherein the clutch includes:
- a first one-way clutch disposed in a transmission path in the power transmission mechanism between the driver and the slave and switchable between an engaged state and a disengaged state; and
- a second one-way clutch for linking the sun gear and the driver when the driver rotates in a forward direction.

18. The device according to claim 17 further comprising a third one-way clutch for linking the driver and the planet gear carrier when the driver rotates in a backward direction.

19. A bicycle shifting device comprising:

a driver;

a slave;

a power transmission mechanism coupled between the driver and the slave for communicating rotational power from the driver to the slave through a plurality of power transmission paths;

wherein the power transmission mechanism includes:
- a sun gear rotatably mounted relative to the driver;
- a planet gear carrier rotatably mounted relative to the driver;
- a planet gear rotatably mounted on the carrier and engaging the sun gear; and
- a gear ring meshing with the planet gear;

a clutch for selecting an individual transmission path from the plurality of power transmission paths in the power transmission mechanism, wherein the clutch includes a first one-way clutch disposed in a transmission path in the power transmission mechanism between the driver and the slave and switchable between an engaged state and a disengaged state;

a clutch actuating mechanism for causing the clutch to select the individual transmission path from the plurality of power transmission paths when the driver is at a predetermined rotational position; and wherein the clutch actuating mechanism comprises a cam plate axially movable between a first axial position and a second axial position, wherein the cam plate includes a guide surface for switching the first one-way clutch into the disengaged state when the cam plate is in the second axial position.

20. The device according to claim 19 wherein the clutch actuating mechanism further comprises a rotary plate for rotation between a first rotational position and a second rotational position, wherein the rotary plate includes a cam component coupled to the cam plate so that the cam plate is in the first axial position when the rotary plate is in the first rotary position and the cam plate is in the second axial position when the rotary plate is in the second rotational position.

21. The device according to claim 20 wherein the cam plate includes:
- a cam follower contacting the cam component; and
- a biasing mechanism disposed between the cam plate and the rotary plate for biasing the cam plate away from the rotary plate.

* * * * *